United States Patent
Shin et al.

(10) Patent No.: US 10,140,048 B2
(45) Date of Patent: Nov. 27, 2018

(54) APPARATUS AND METHOD FOR FILE RECORDING BASED ON NON-VOLATILE MEMORY

(71) Applicants: RESEARCH & BUSINESS FOUNDATION SUNGKYUNKWAN UNIVERSITY, Suwon-si (KR); CENTER FOR INTEGRATED SMART SENSORS FOUNDATION, Daejeon (KR)

(72) Inventors: Dong Kun Shin, Seoul (KR); Young Hun Kim, Suwon-si (KR); Jin Young Yang, Seoul (KR)

(73) Assignees: Research & Business Foundation Sungkyunkwan University, Suwon-si (KR); Center for Integrated Smart Sensors Foundation, Daejeon (KR)

( * ) Notice: Subject to any disclaimer, the term of this patent is extended or adjusted under 35 U.S.C. 154(b) by 24 days.

(21) Appl. No.: 15/387,232

(22) Filed: Dec. 21, 2016

(65) Prior Publication Data

US 2017/0177267 A1   Jun. 22, 2017

(30) Foreign Application Priority Data

Dec. 22, 2015   (KR) .................. 10-2015-0183966

(51) Int. Cl.
    *G06F 12/00*   (2006.01)
    *G06F 3/06*    (2006.01)
    *G06F 17/30*   (2006.01)

(52) U.S. Cl.
    CPC .......... *G06F 3/0643* (2013.01); *G06F 3/0604* (2013.01); *G06F 3/0631* (2013.01); *G06F 3/0679* (2013.01); *G06F 17/30218* (2013.01)

(58) Field of Classification Search
    None
    See application file for complete search history.

(56) References Cited

U.S. PATENT DOCUMENTS

| 6,745,311 B2 * | 6/2004 | Fabrizio | ................... G01K 7/01 |
|---|---|---|---|
| | | | 374/E7.035 |
| 2011/0320692 A1 * | 12/2011 | Maeda | .................. G06F 3/0613 |
| | | | 711/103 |

FOREIGN PATENT DOCUMENTS

| KR | 10-1502725 B1 | 3/2015 |
| KR | 10-2015-0071738 A | 6/2015 |

OTHER PUBLICATIONS

Park, New techniques for real-time FAT file system in mobile multimedia devices, IEEE Transactions on Consumer Electronics ( vol. 52, Issue: 1, Feb. 2006, pp. 1-9 ), published Mar. 13, 2006 (Year: 2006).*

(Continued)

*Primary Examiner* — Brian R Peugh
*Assistant Examiner* — Jason W Blust
(74) *Attorney, Agent, or Firm* — NSIP Law

(57) ABSTRACT

The present disclosure includes a non-volatile memory having a boot region, a file allocation table region and a data region; a memory configured to store a program for managing a file recording; and a processor configured to execute the program. Wherein the processor allocates metadata corresponding to a file to be stored in the non-volatile memory to the FAT region as the program is executed, the processor allocates a plurality of clusters to the data region based on information upon a size of the file included in the metadata, the processor writes the file in the plurality of clusters allocated to the data region, if a size of the written file is different from a size of the plurality of allocated clusters, the processor updates the metadata based on the size of the file.

12 Claims, 14 Drawing Sheets

(56) References Cited

OTHER PUBLICATIONS

Younghun Kim, et al., "High Performance and High Reliable File System for Car Digital Video Recorders," *Proceedings for the 2015 IEE International Conference on Consumer Electronics (ICCE)*, Las Vegas, USA, Jan. 9-12, 2015, p. 180 (3 pages, in English).
Younghun Kim, et al., "Improving File System Performance and Reliability of Car Digital Video Recorders," *Proceedings of the IEEE Transactions on Consumer Electronics*, vol. 61, No. 2, May 2015, p. 222 (3 pages in English).
Cheolgyu Shin, et al., "Optimization of exFAT file system for NAND flash based video recording device,"*The Korean Institute of Information Scientists and Engineers*, Winter Conference, Dec. 19, 2015, pp. 1561-1563. (1 page in English, 2 pages in Korean).

\* cited by examiner

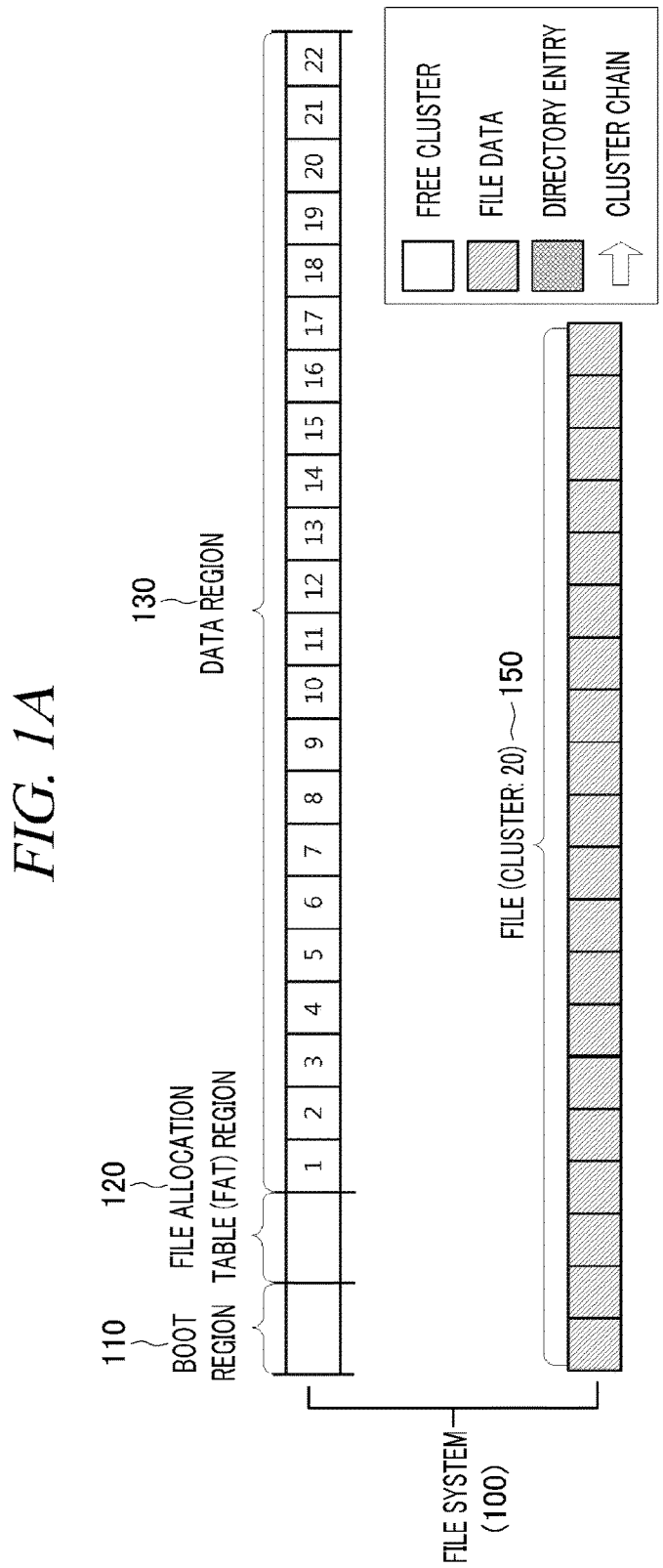

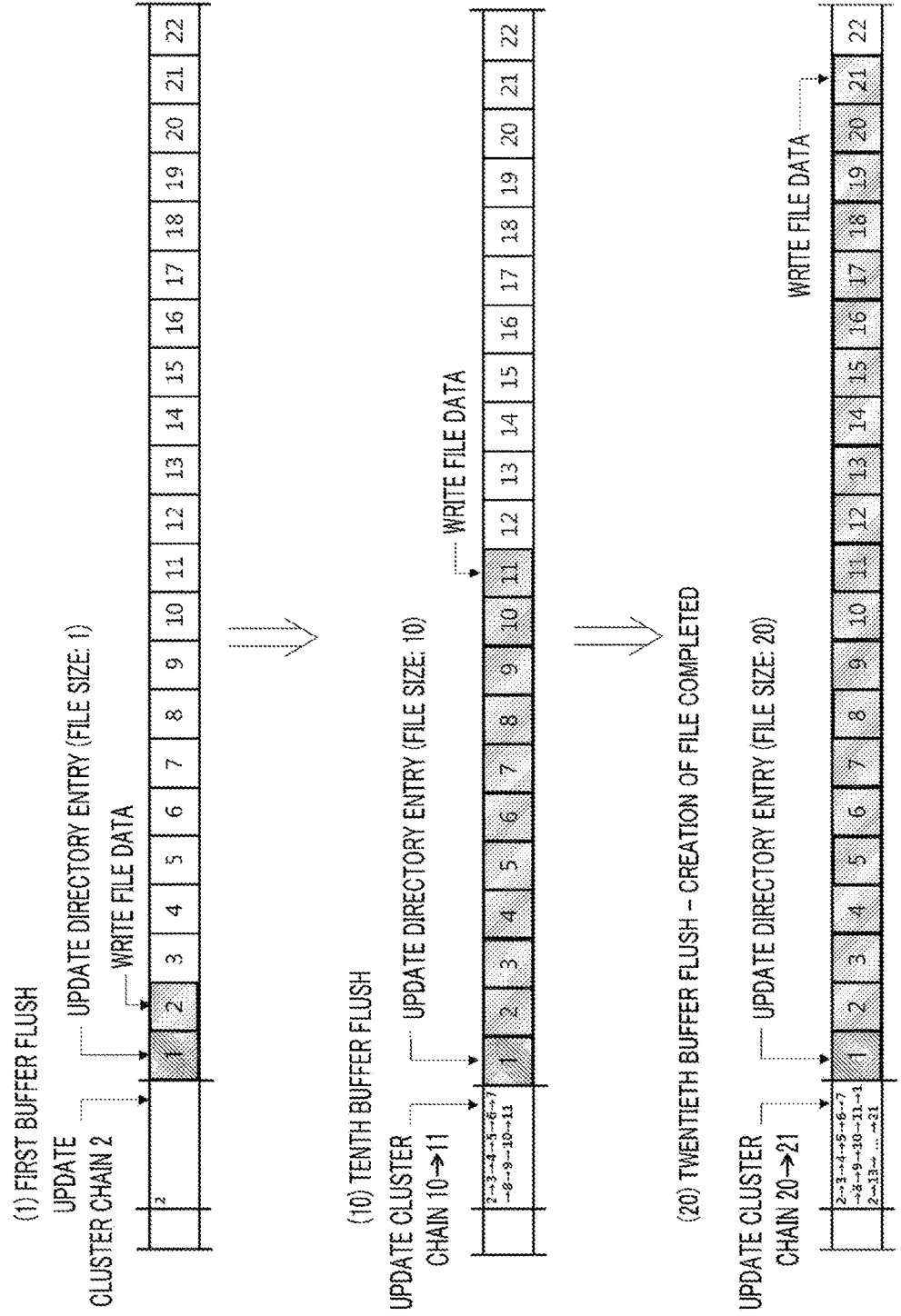

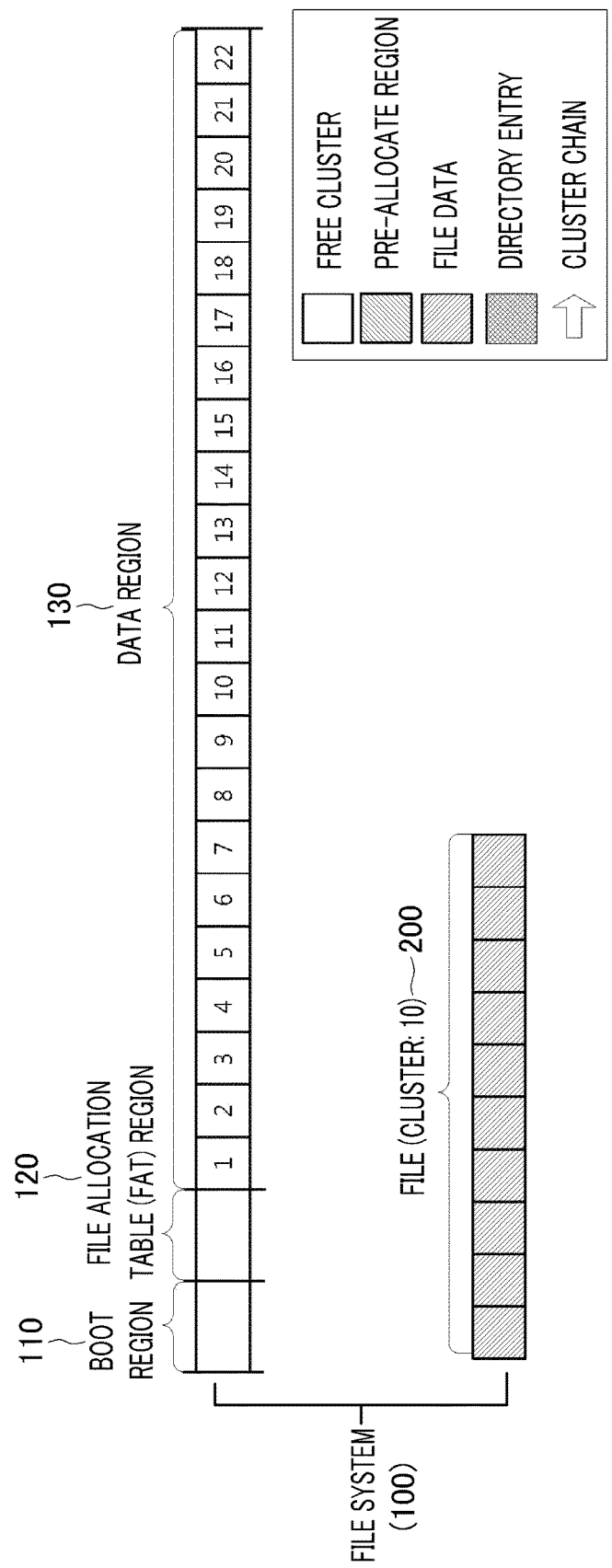

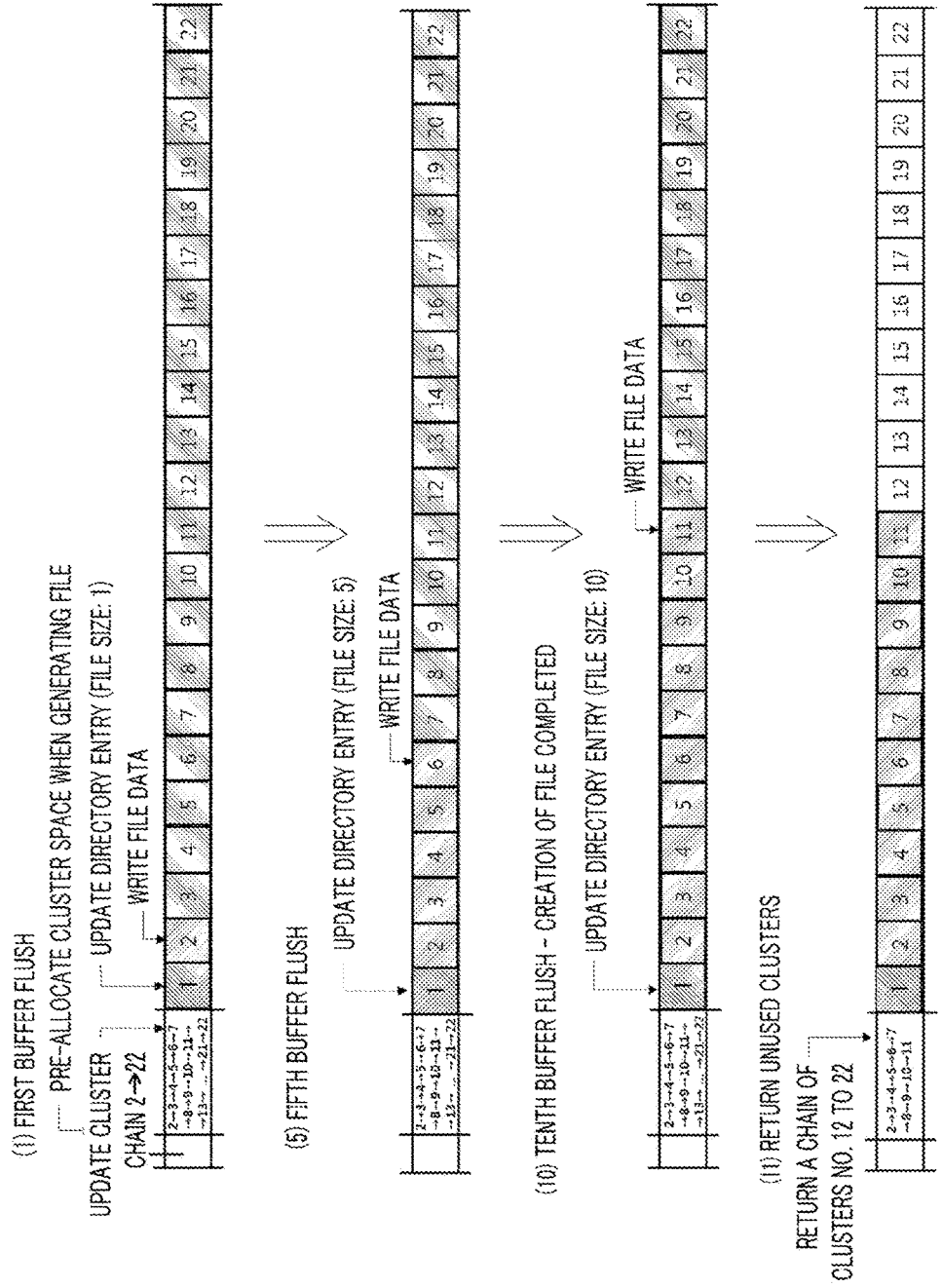

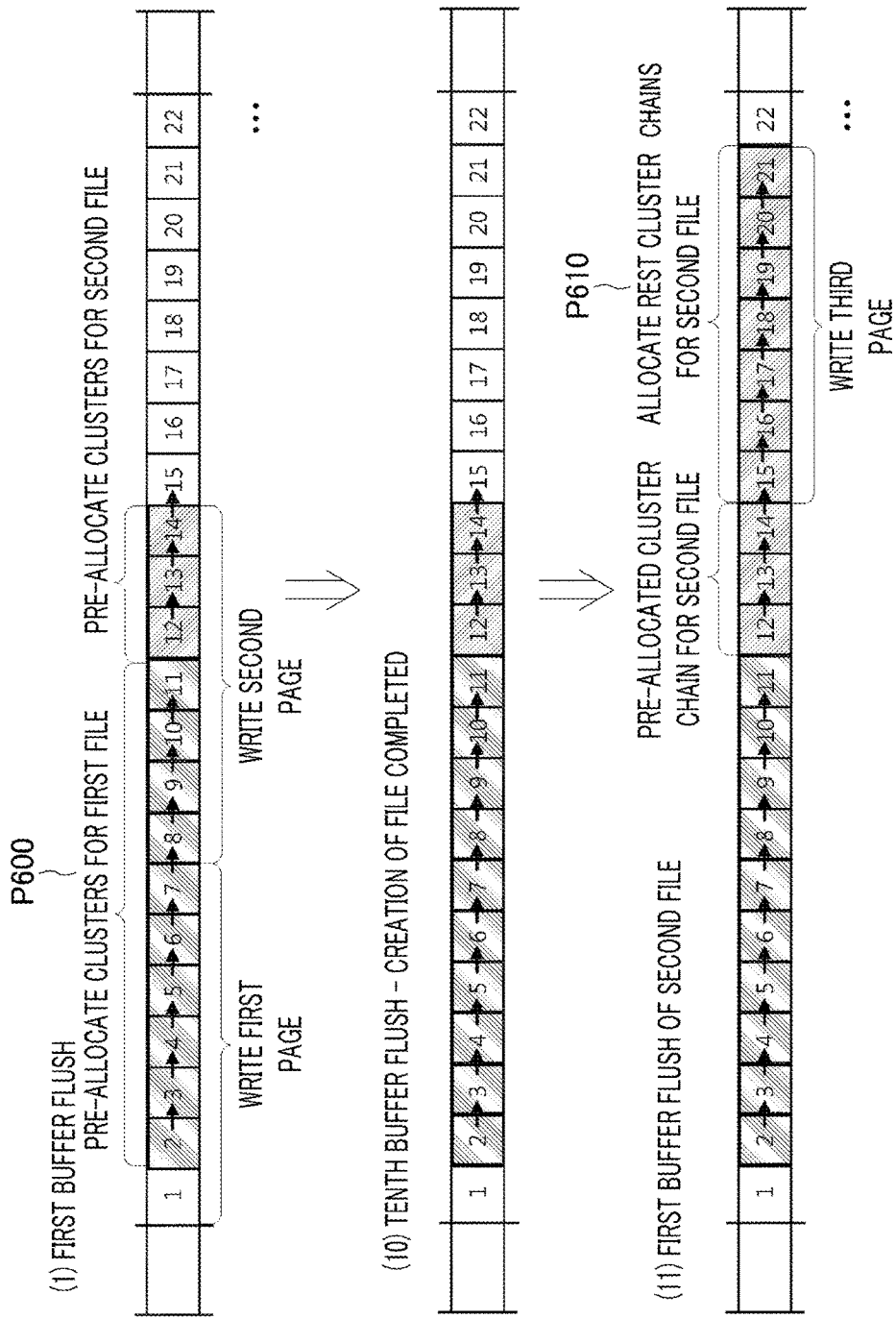

APPARATUS AND METHOD FOR FILE RECORDING BASED ON NON-VOLATILE MEMORY

CROSS-REFERENCE TO RELATED APPLICATION

This application claims the benefit under 35 USC 119(a) of Korean Patent Application No. 10-2015-0183966 filed on Dec. 22, 2015 in the Korean Intellectual Property Office, the entire disclosures of which are incorporated herein by reference for all purposes.

TECHNICAL FIELD

The various embodiments described herein pertain generally to an apparatus and a method for file recording based on a non-volatile memory.

BACKGROUND

A file recording apparatus which generates data continually is configured to manage files by dividing them in a certain time unit. Thus, the file recording apparatus is operating to store a single file in a non-volatile memory such as a NAND flash memory multiple times. Further, the file recording apparatus also serves to upload metadata related to the file stored in the non-volatile memory when the file is stored. The metadata is a structure storing therein data upon, for example, a position and a size of the file stored in the volatile memory as well as a time when the file is generated and a time when the file is accessed.

As mentioned above, in the file recording medium, metadata regarding a file is stored when the file is stored. Further, in the file recording medium, when an operation such as read/write of a file is performed, metadata of this file is updated. Generally, the update of the metadata does not cause any significant problem because its size is small as compared to wiring actual data included in the file and this updating does not take place frequently.

As for an image file recording apparatus which collects and stores files continually, however, frequent metadata updating may be a problem if this image file recording apparatus uses a non-volatile memory as a storage.

To elaborate, the image file recording apparatus stores image data collected through a camera in the non-volatile memory after converting the image data into a file form. At this time, the image file recording apparatus first stores the image data converted into the file form in a buffer which is located on the memory, and, then, if a certain amount of data is collected, records the image data in the non-volatile memory by performing a flush. Here, in the process of recording the certain amount of data collected in the buffer, the image file recording apparatus updates metadata such as position information of the file data recorded in the storage and the like.

Thus, in the image file recording apparatus, the updating of the metadata may be performed frequently. In the image file recording apparatus using the non-volatile memory such as a NAND flash memory, such a frequent updating of the metadata may cause a reduction in a lifetime of the non-volatile memory and deterioration in a performance thereof.

In this regard, Korean Patent Laid-open Publication No. 10-2015-0071738 (entitled "blackbox for vehicle and method for recording image using same") discloses a vehicle black box configured to generate a second image data by extracting a brightness component from a first image data which is stored before and after an accident of a vehicle and to transmit the generated second data to a preset external device. Further, this document discloses an image recording method for this vehicle black box as well.

SUMMARY

In view of the foregoing, example embodiments provide an apparatus and method for file recording, capable of reducing the number of metadata updating in a non-volatile memory in which there is a limit in the number of write operations that can be performed.

However, the problems sought to be solved by the present disclosure are not limited to the above description, and other problems can be clearly understood by those skilled in the art from the following description.

As a technical means for solving the above-described problem, in accordance with a first exemplary embodiment, there is provided a file recording apparatus based on a non-volatile memory. Wherein the apparatus includes a non-volatile memory having a boot region, a file allocation table (FAT) region and a data region; a memory configured to store a program for managing a file recording; and a processor configured to execute the program. Wherein the processor allocates metadata corresponding to a file to be stored in the non-volatile memory to the FAT region as the program is executed, the processor allocates a plurality of clusters to the data region based on information upon a size of the file included in the metadata, the processor writes the file in the plurality of clusters allocated to the data region, if a size of the written file is different from a size of the plurality of allocated clusters, the processor updates the metadata based on the size of the file, and the metadata includes information upon a cluster chain of the plurality of clusters and the size of the file.

Further, in accordance with a second exemplary embodiment, there is provided a file recording method of a file recording apparatus. The method includes allocating metadata corresponding to a file to be stored in a non-volatile memory to a FAT region included in the non-volatile memory; allocating a plurality of clusters to a data region included in the non-volatile memory based on information upon a size of the file included in the metadata; writing the file in the plurality of clusters allocated to the data region after the allocating of the metadata and the allocating of the plurality clusters; and if a size of the written file is different from a size of the plurality of allocated clusters, updating the metadata based on the size of the file, wherein the non-volatile memory has the FAT region, the data region and a boot region, and the metadata includes information upon a cluster chain of the plurality of clusters and the size of the file.

In accordance with the example embodiments, the number of metadata updating per a file, which may be performed when recording a file in a non-volatile memory, can be reduced to several times to twice. Further, the number of updating upon a physical page in which metadata is stored can be reduced to twice or less depending on the file involved. Therefore, it is possible to solve problems such as deterioration of a write performance and reduction in a lifetime, which might easily occurs in an image file recording apparatus such as a black box.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1A and FIG. 1B are a diagram illustrating an example of metadata updating in a conventional file recording apparatus using a file allocation table file system and a non-volatile memory;

FIG. 2A and FIG. 2B are a diagram illustrating an example of pre-allocation of metadata in the conventional file recording apparatus;

FIG. 6A and FIG. 6B are a diagram illustrating an example of cluster chain allocation of the file recording apparatus in accordance with the example embodiment;

DETAILED DESCRIPTION

Figure 3A:
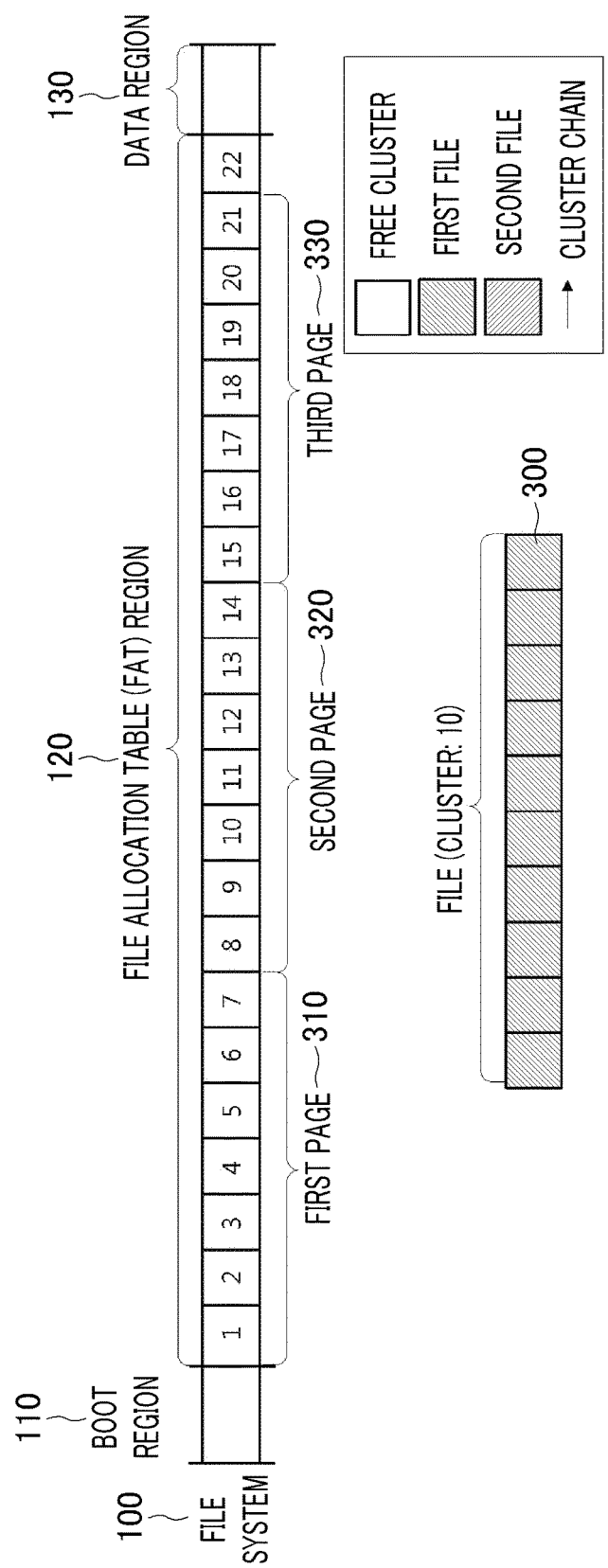
FIG. 3A and FIG. 3B are diagram illustrating an example of a file allocation table region during pre-allocation of metadata in the conventional file recording.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Hereinafter, referring to FIG. 1A to FIG. 3B, a conventional file recording apparatus using a file allocation table (FAT) file system will be explained.

FIG. 1A and FIG. 1B are a diagram illustrating an example of metadata updating of the conventional file recording apparatus using the FAT file system and a non-volatile memory.

As depicted in FIG. 1A, the FAT file system 100 utilizes the non-volatile memory by dividing it into three regions: a boot region 110, a FAT region 120 and a data region 130. Information upon the file system or the non-volatile memory is stored in the boot region 110. Metadata regarding a file is stored in the FAT table region 120. The data region 130 is managed by being divided into one or more clusters, and data included in an actual file is stored in each cluster.

Further, in the data region 130, the file can be stored in one or more clusters. Thus, the metadata in the FAT file system 100 may include a cluster chain indicating a relationship between the clusters to manage the file which is stored in the one or more clusters.

As depicted in FIG. 1B, generally, in case of recording the data included in the file at one time, the conventional file recording apparatus may update the metadata twice while updating a directory entry and the cluster chain. Here, the directory entry may include information upon a name of the file, a size of the file, an access time to the file, etc.

In a vehicle black box, however, files are generated by being separated in a unit of one minute, and there is a buffer flush cycle of about 3 seconds. Accordingly, in order to produce a single file having a length of one minute, buffer flushes and following metadata updating take place about 20 times in the conventional file recording apparatus. That is, in order to complete the production of a single file, the conventional file recording apparatus may update the metadata twenty times or more, more than a case where a general file is recorded.

This problem may occur in another file system such as an extended file allocation table (exFAT) which does not produce a cluster chain. Though the exFAT does not produce a cluster chain, updating upon a cluster beat map indicating whether or not a certain cluster is used is conducted. Thus, in a conventional file recording apparatus using the exFAT, frequent updating of the cluster bitmap and a directory entry may be performed frequently.

Meanwhile, in the conventional file recording apparatus using the non-volatile memory, in case that the updating of the metadata is frequently performed, a write performance may be deteriorated, and a life time of the apparatus may be reduced. In general, the non-volatile memory performs a write operation on a page unit of 4 KB to 8 KB. Further, the non-volatile memory has a characteristic that inplace updating is impossible. Thus, in case of performing a write operation in a smaller size than a page size, just like in the updating of the metadata, the conventional file recording apparatus needs to read out, from the non-volatile memory, another date which is not newly written within an internally same page. Then, the conventional file recording apparatus performs a read-modify-write (RMW) operation of combining the read data with newly written data and recording the combined data on a new page. At this time, the file recording apparatus may suffer deterioration in its write performance.

Further, the conventional file recording apparatus utilizes a low-priced secure digital (SD) memory. Thus, in the conventional file recording apparatus, the number of write operations in a block unit may be increased if metadata updating is frequently performed by a hybrid mapping type or block mapping type flash translation layer (FTL) in order to manage internal data. Thus, in view of the characteristic of the non-volatile memory that there is a limit in the number of write operations that can be conducted, the life time of the memory would be decreased more quickly.

In order to reduce the number of the metadata updating which occurs frequently as stated above, the conventional file recording apparatus employs a pre-allocation technique of allocating metadata upon position information of file data to a file allocation table region in advance. This pre-allocation scheme will be elaborated with reference to FIG. 2.

FIG. 2A and FIG. 2B are a diagram illustrating an example of pre-allocation in the conventional file recording apparatus.

As depicted in FIG. 2A and FIG. 2B, when generating a file, the conventional file recording apparatus allocates all available spaces unoccupied in the data region 130 to the file, or allocates a space having a size larger than a size of the file to be generated. Then, the conventional file recording apparatus generates a cluster chain and performs updating of the FAT region 120. In this conventional file recording apparatus, even if additional data recording occurs, updating of the cluster chain is not performed as the sufficient size of space is previously allocated.

If the file is finally produced, the conventional file recording apparatus returns the previously allocated but not used space, and updates the metadata for the return of the space. Therefore, even if a continual write operation is conducted, the conventional file recording apparatus using this pre-allocation method is capable of reducing the number of updating upon the FAT region to twice.

As depicted in FIG. 2B, the conventional file recording apparatus may update the metadata twice. The conventional file recording apparatus, however, may still perform frequent updating upon a directory entry storing information upon the size of the file and an access time as well as the FAT region. The frequent updating of this FAT region will be described in detail with reference to FIG. 3A and FIG. 3B.

Figure 3B:
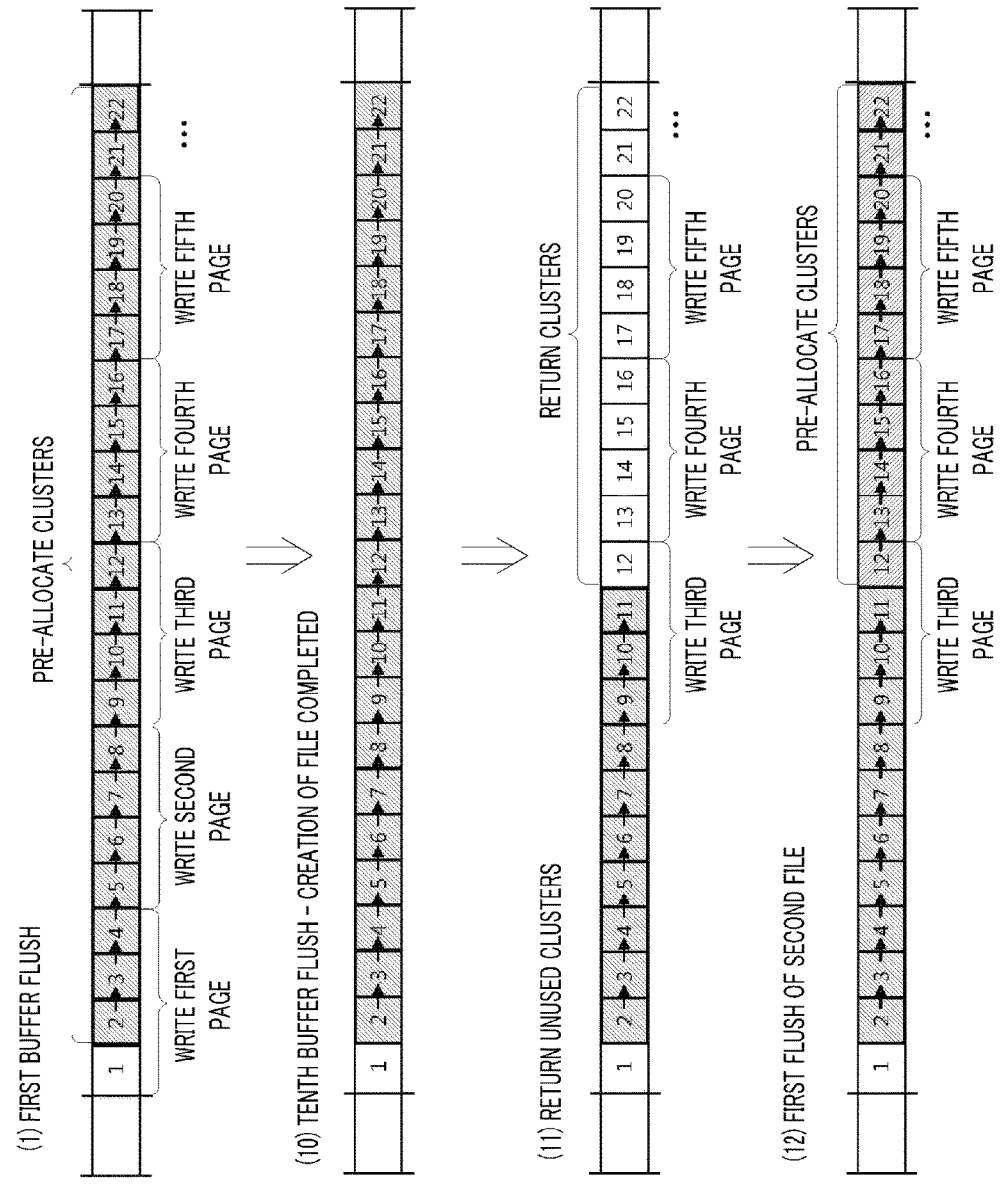

FIG. 3A and FIG. 3B are a diagram illustrating a FAT region at a time of pre-allocating metadata in the conventional file recording apparatus.

The conventional file recording apparatus is capable of performing a process of pre-allocating a chain of clusters in a non-volatile memory and returning unused clusters among the pre-allocated clusters. At this time, the conventional file recording apparatus may perform updating for a part of the FAT region several times. Particularly, due to the characteristic of the non-volatile memory where updating is performed in a page unit, write upon the same page may performed several times.

Now, a file recording apparatus 400 in accordance with an example embodiment will be discussed with reference to FIG. 4 to FIG. 7B.

Figure 4:
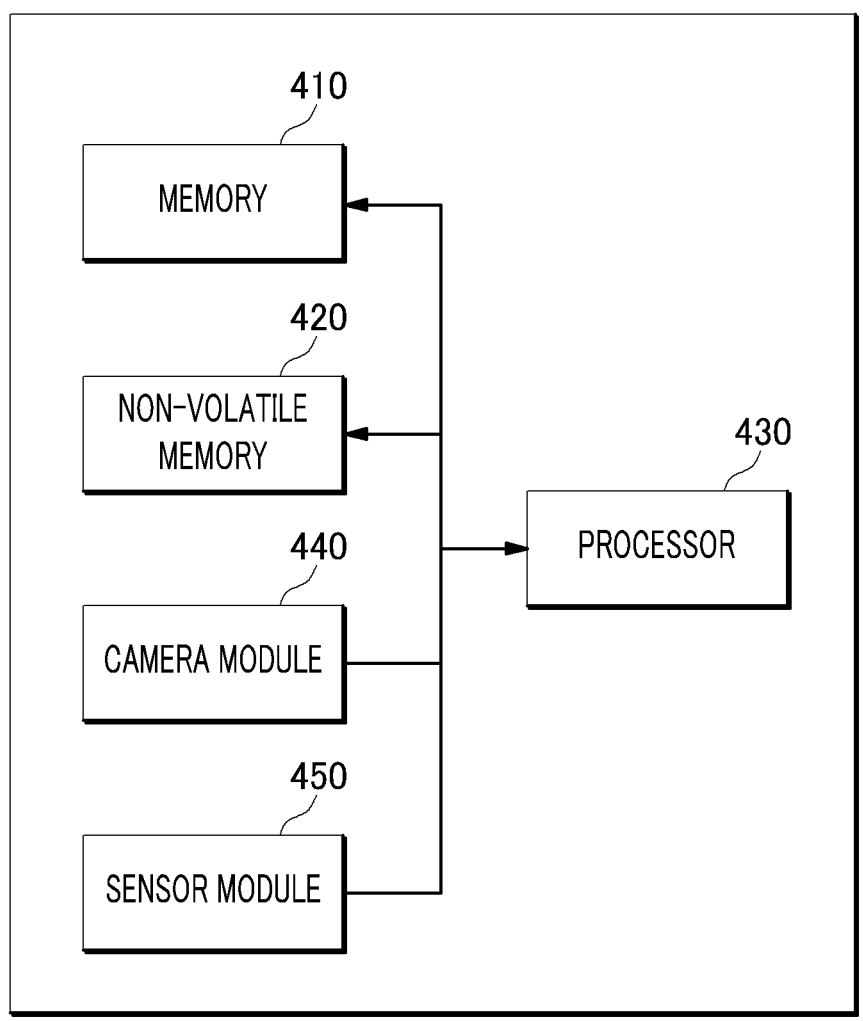
FIG. 4 is a block diagram of a file recording apparatus in accordance with an example embodiment.

FIG. 4 is a block diagram illustrating the file recording apparatus 400 in accordance with the example embodiment.

The file recording apparatus 400 of the example embodiment is capable of improving a lifetime and a performance of a non-volatile memory 420 by minimizing the number of updating of metadata when recording a file in the non-volatile memory 420 in which there is a limit in the number of writes that can be conducted. The file recording apparatus 400 is equipped with a memory 410, the non-volatile memory 420 and a processor 430.

In the file recording apparatus 400, the non-volatile memory 420 stores therein a file which is transferred through a communication module (not shown). The non-volatile memory 420 has a boot region 510, a file allocation table (FAT) region 520 and a data region 530.

The memory 410 stores therein a program for managing file recording. Here, the memory 410 refers to both a non-volatile storage capable of maintaining stored information even if an electric power is not supplied and a volatile memory which requires an electric power to maintain stored information. Further, the memory 410 may be implemented by the non-volatile memory 420 of the file recording apparatus 400, or may be implemented by another non-volatile memory which is additionally installed in the file recording apparatus 400.

The file recording apparatus 400 in accordance with the example embodiment may be a black box. Here, the term "black box" refers to all kind of devices mounted to a vehicle and configured to record data. For example, the black box may include all kinds of vehicle data recording devices such as, but not limited to, a flight data recorder (RDR) mounted to an airplane and configured to record a state of the airplane, voice information containing sounds and voices in a fight deck, voice information containing communication messages, etc.; a voyage data recorder (VDR) mounted to a ship and configured to record an operational status of various nautical instruments, sent and receives messages in communications equipment, images of the inside of a wheelhouse and voices therein, etc.; and an event data recorder (EDR) mounted to an automobile and configured to record information related to automobile crashes or accidents such as image information including images of the inside and the outside of the automobile and voice information containing voices within the automobile, etc.

Further, if the file recording apparatus 400 is a black box, it may further include a camera module 440 and a sensor module 450 in addition to the memory 410, the non-volatile memory 420 and the processor 430.

The camera module 440 is configured to capture a stationary or moving image. Here, the camera module 440 may be directly mounted to the file recording apparatus 400. Alternatively, the camera module 440 may be installed at an outside of the file recording apparatus 400 and connected thereto.

Furthermore, the file recording medium 400 may include one or more sensor modules 450. The sensor module 450 may be implemented by a motion sensor and a position sensor. By way of non-limiting example, the motion sensor may include various kinds of motion-based sensors, such as an accelerator sensor, a G-sensor and a gyroscope sensor, capable of detecting running or parking of a vehicle or detect an event such as a vehicle crash or accident in the black box device. Further, the position sensor may include various kinds of position-based sensors, such as a global positioning system (GPS) or a geomagnetic sensor, capable of detecting a current position of a vehicle, a driving direction, and so forth.

The processor 430 is configured to allocate metadata corresponding to a file to be stored in the non-volatile memory 420 to the FAT region 520 as a program for managing a file recording stored in the memory 410 is executed. Then, the processor 430 allocates a multiple number of clusters to the data region 530 based on a size of the file included in the metadata. Here, the file to be stored in the non-volatile memory 420 may be an image recording file which is continually generated.

Further, the metadata contains information upon a cluster chain regarding the multiple number of clusters and the size of the file.

Furthermore, unlike the conventional file recording apparatus 400, the file recording apparatus 400 in accordance with the example embodiment may not include time information indicating access time to the metadata. In case that files are continuously generated, the file recording apparatus 400 may generate those files continually in a preset time unit. Further, in the file recording apparatus 400, a name of a file may contain time information such as date and time when the file is generated. Accordingly, based on the name of the file, the file recording apparatus 400 may infer an access time to the file during the production of the single file. That is, the file recording apparatus 400 may neglect updating of metadata regarding the access time.

In addition, if an image file is generated continuously in the preset time unit, a size of the generated image file to be stored in the non-volatile memory 420 may also be predicted. That is, the size of the file contained in the metadata may be previously predicted depend on a preset length. For example, if a file is image data of 30 seconds and if the processor 430 stores data recorded in a buffer into the non-volatile memory 420 every three seconds, the process 430 may predict the size of the file to be of ten clusters and allocate them to the metadata.

As stated above, the processor 430 is configured to predict the size of the file and pre-allocate the metadata containing the predicted size of the file to the FAT region 520. Here, the processor 430 may pre-allocate a file size slightly larger than the predicted file size to the metadata in consideration of a margin.

Further, the processor 430 is configured to allocate plural clusters to the data region 530 based on the file size contained in the metadata after allocating the metadata corresponding to the file to be stored in the non-volatile memory 420 to the FAT region 520.

Further, the processor 430 is also configured to write the file into the plural clusters allocated to the data region 530. After the write operation is completed, if a size of the written file is different from a size corresponding to the previously allocated plural clusters, the processor 430 updates the metadata. The process of pre-allocating and updating the metadata performed by the file recording apparatus 400 will be elaborated below with reference to FIG. 5A and FIG. 5B.

Figure 5A:
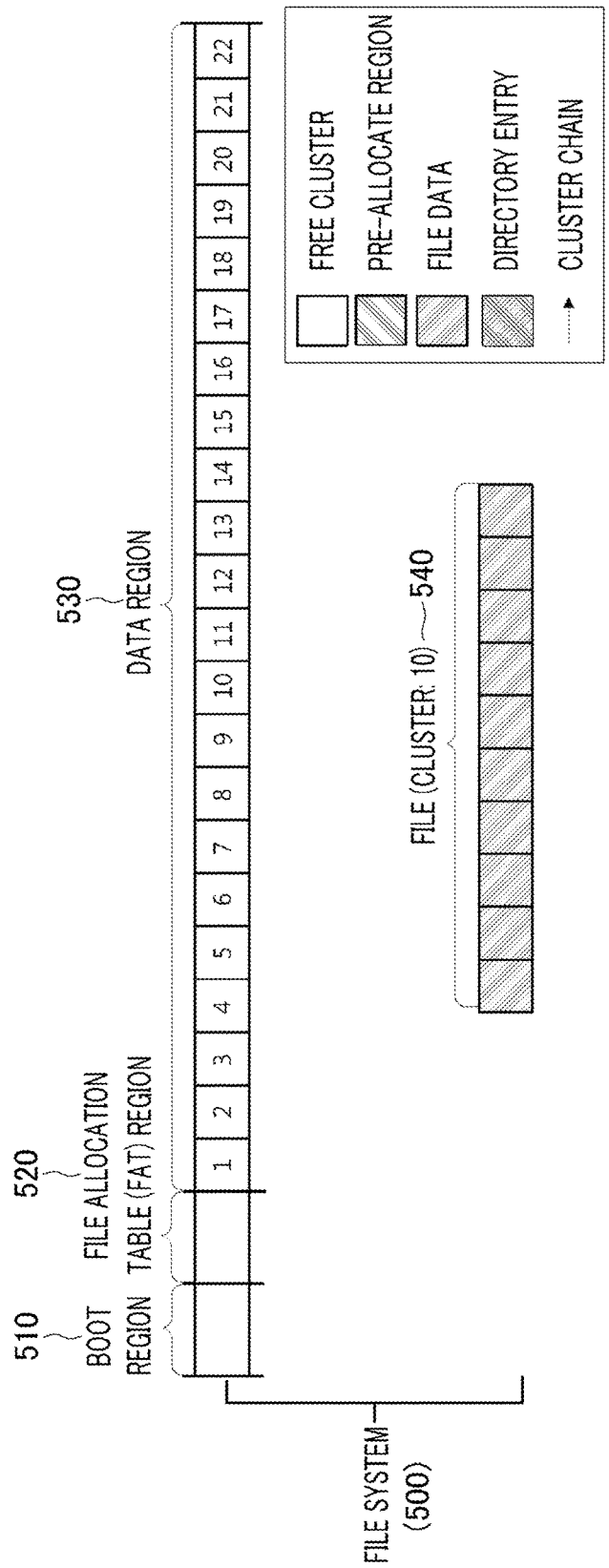
FIG. 5A and FIG. 5B are a diagram illustrating an example of the file recording apparatus in accordance with the example embodiment.
Figure 5B:
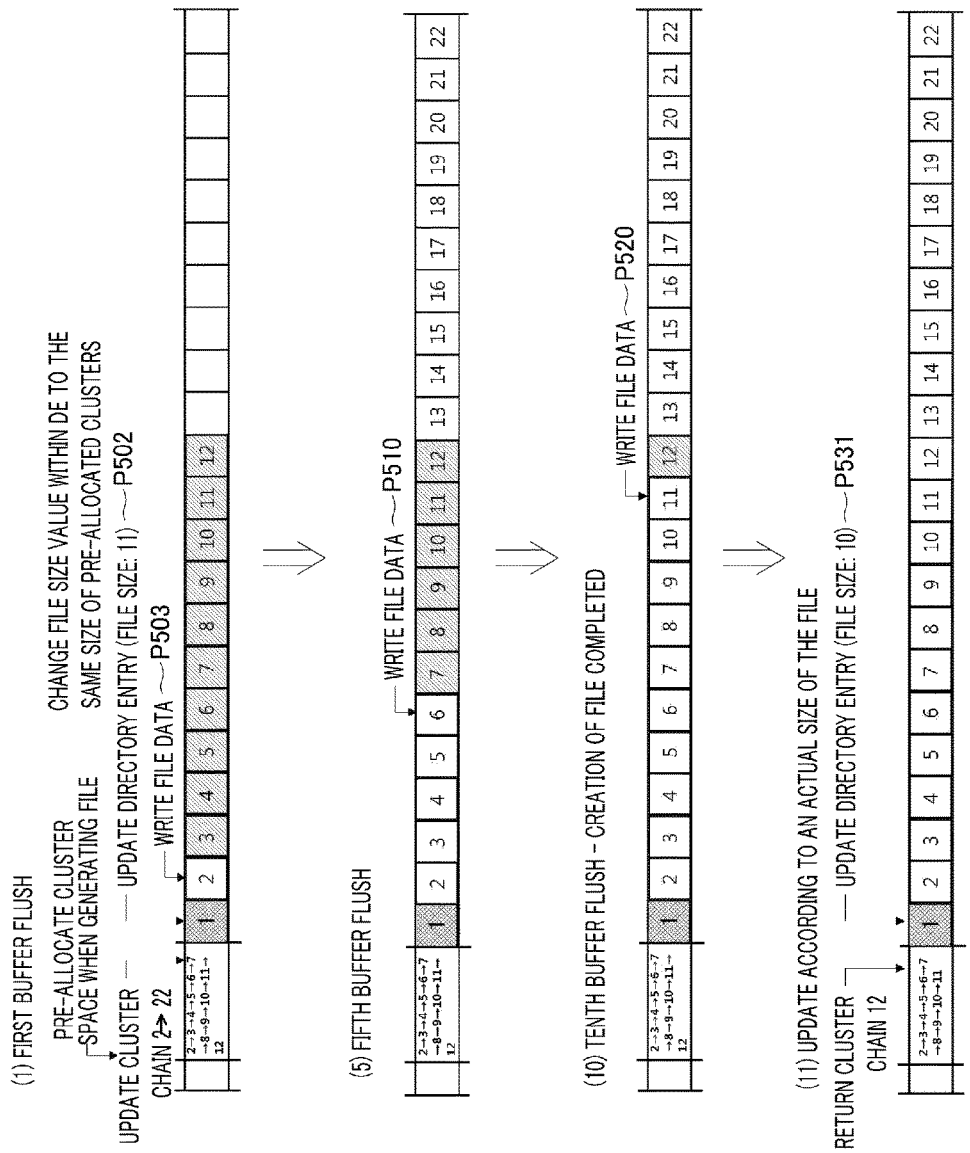

FIG. 5A and FIG. 5B are a diagram illustrating an example of the file recording apparatus 400 in accordance with the example embodiment.

The processor 430 is configured to pre-allocate metadata containing a cluster chain to the FAT region 520 at a time when generating a first file 540. That is, the processor 403 is capable of pre-allocating eleven clusters to the data region 530 (p501), corresponding to the first file 540 including ten clusters. Then, the processor 430 is capable of updating the cluster chain regarding the eleven clusters to the FAT region 520 (P502). At this time, a directory entry is stored in the first cluster (cluster No. 1) of the data region 530. Accordingly, clusters for the first file 530 may range from cluster No. 2 to cluster No. 12.

The processor 430 is configured to store data contained in the file into the data region 530 whenever a buffer flush is conducted. By way of example, if the first buffer flush occurs, the processor 430 may write file data corresponding to the first buffer flush in the second cluster (P503). Further, if the fifth buffer flush occurs, the processor 430 may write file data corresponding to the fifth buffer flush in the sixth cluster (P510). Then, if the tenth buffer flush occurs, the processor 430 may write corresponding file data in the eleventh cluster (P520). Here, since one more cluster is previously allocated, the processor 430 may return the twelfth cluster (P530), which is not used in recording the actual first file 540, after the file is finally created.

To elaborate, after the processor 430 completes the file write in the allocated clusters in the data region 530, the processor 430 may update the metadata if the size of the written file is different from the size of the allocated clusters. That is, in such a case, the processor 430 may update the metadata to cancel the allocation of unused clusters in which no file data is stored. Further, the processor 430 may update the directory entry depend on the metadata update (P531).

Meanwhile, the processor 430 is configured to allocate the cluster chain contained in the metadata to the FAT region 520 in a page unit.

Figure 6A:
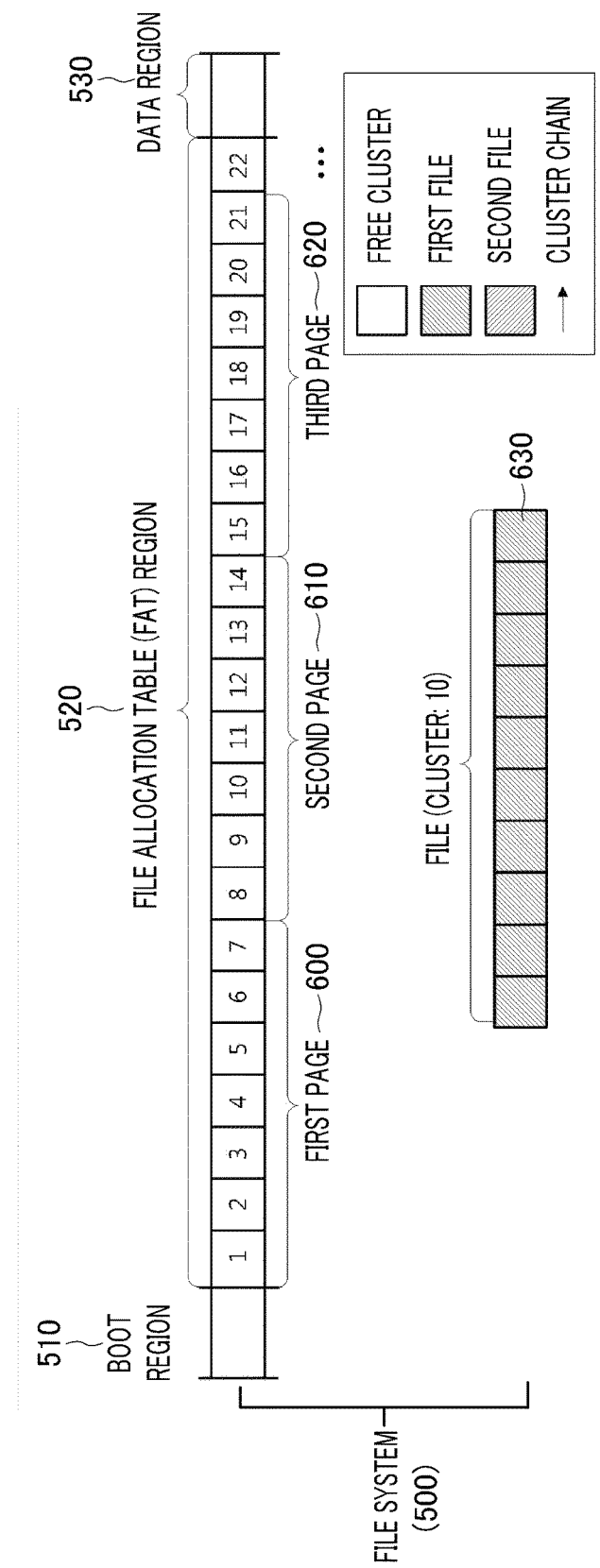

FIG. 6A and FIG. 6B are a diagram illustrating an example of allocation of a cluster chain in the file recording apparatus 400 in accordance with the example embodiment.

For example, a single page of the FAT region 520 is capable of storing a chain of 7 clusters. Thus, the processor 430 may pre-allocate a cluster chain related to the first file 630 having a size of 10 clusters in 'First Page' (600) and 'Second Page' (610).

Further, the processor 430 is capable of pre-allocating a cluster chain to one or more pages contained in the FAT region 520. At this time, if any page to which the cluster chain is allocated for the first file 630 has an empty space (cluster) as in the "Second Page" (610), the processor 430 may allocate empty spaces (clusters) as a part of a cluster chain which is to be allocated for a second file 640 to be stored next. That is, since the "Second Page" (610) has three empty spaces (clusters), the processor 430 may allocate clusters No. 12 to No. 14 in the "Second Page" (610) as the first three clusters of the cluster chain of the second file 640.

If the 10 times of flushes for the first file 630 is completed, the processor 430 may allocate the cluster chain for the second file 640. That is, the processor 430 may allocate a chain of clusters for the second file except for the previously allocated three clusters to "Third Page" (620).

Figure 7A:
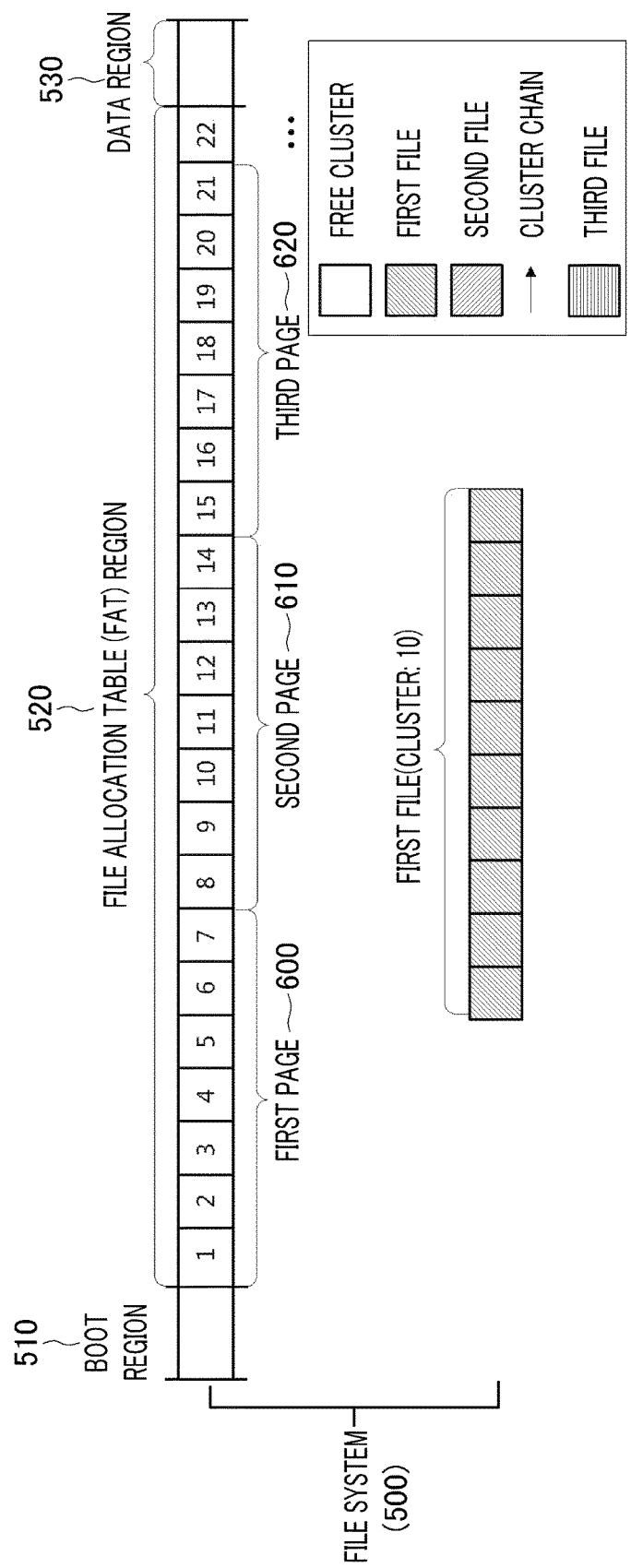
FIG. 7A and FIG. 7B are a diagram illustrating an example of the file recording apparatus in accordance with the example embodiment.
Figure 7B:
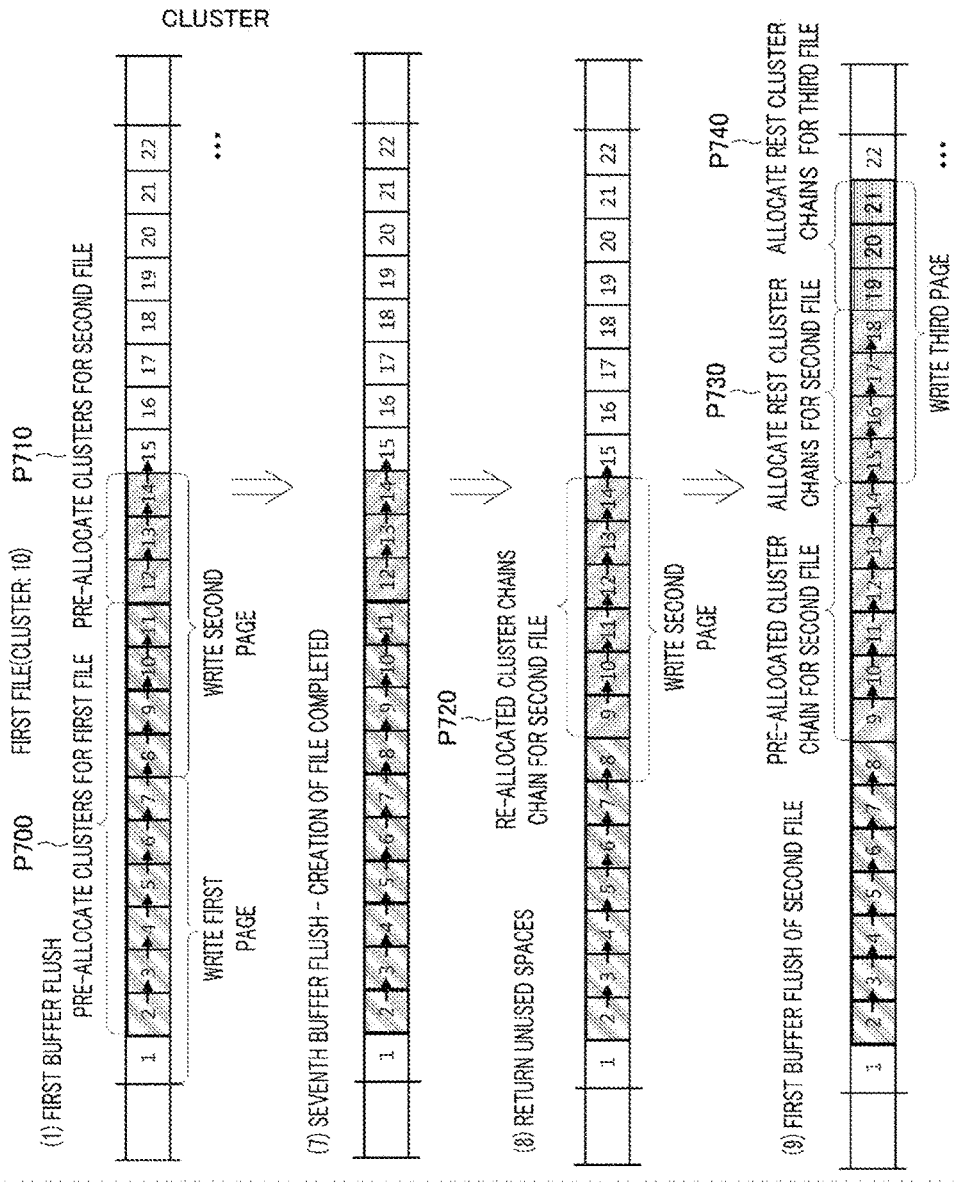

FIG. 7A and FIG. 7B are a diagram illustrating an example of the file recording apparatus 400 in accordance with the example embodiment.

If the size of the generated file to be stored is different from the predicted file size, the processor 430 may re-allocate, among the previously allocated clusters for the first file 630, clusters of the "Second Page" (610) in which no file data is stored to the second file 640 (P720). Then, the processor 430 may pre-allocate clusters for the second file 640 which are not allocated in the "Second Page" (610) to the "Third Page" (620) (P730).

Here, if there exists no empty space in the "Third Page" (620) to which the second file 640 is allocated, the processor 430 may not allocate a cluster chain for another file in this page any more. If, however, there exists an empty space in the "Third Page" (620), the processor 430 may allocate a cluster chain for a third file 700 in the empty space of the "Third Page" (620) (P740).

Now, a file recording method of the file recording apparatus 400 in accordance with the example embodiment will be explained with reference to FIG. 8.

Figure 8:
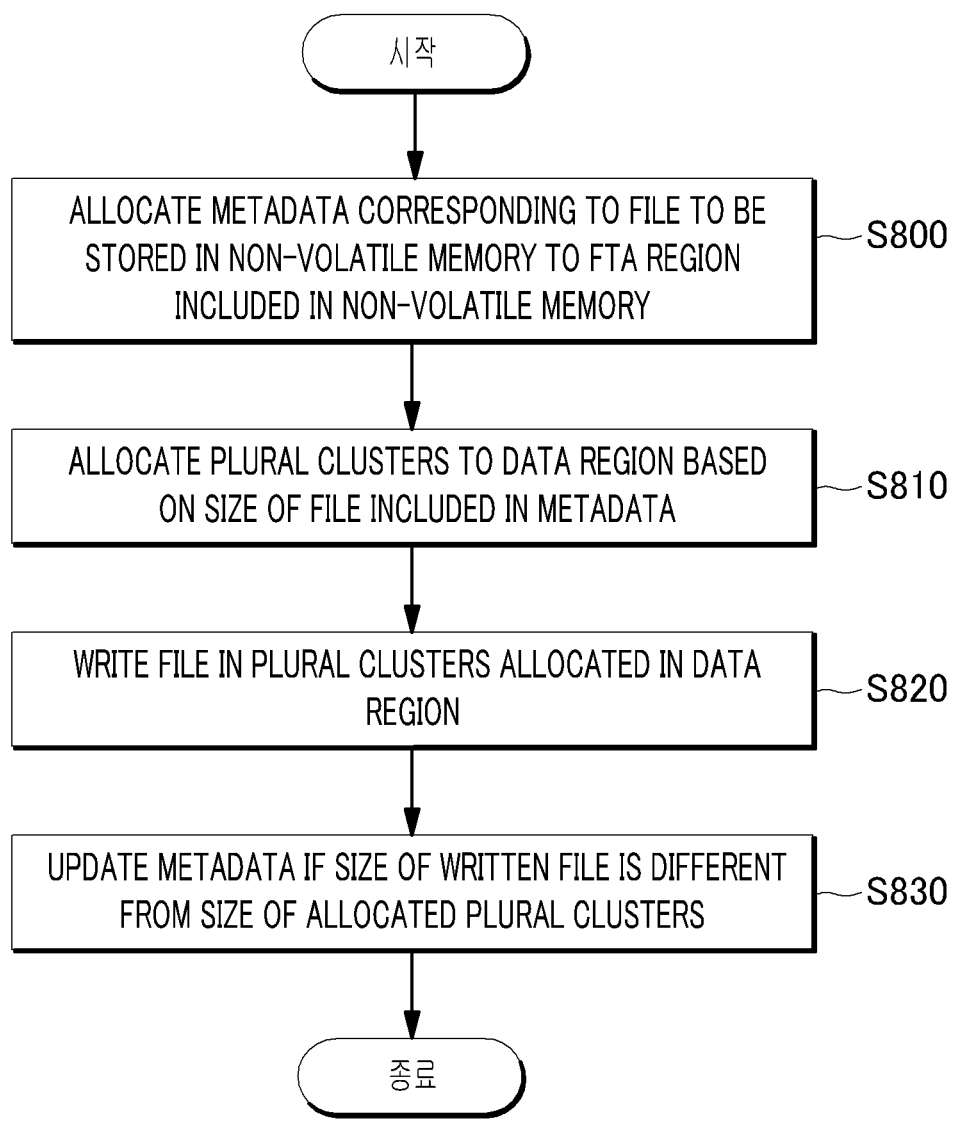
FIG. 8 is a flowchart for describing a file recording method of the file recording apparatus in accordance with the example embodiment.

FIG. 8 is a flowchart for describing the file recording method of the file recording apparatus 400 in accordance with the example embodiment.

The file recording apparatus 400 allocates metadata corresponding to a file to be stored in the non-volatile memory 420 to the FAT region 520 included in the non-volatile memory 420 (S800). Here, the non-volatile memory 420 may include the FAT region 520, the data region 530 and the boot region 510.

Further, the metadata contain information upon a cluster chain of a multiple number of clusters and a size of the file.

The file recording apparatus 400 allocates a plurality of clusters to the data region 530 based on the size of the file contained in the metadata (S810).

Then, after the file recording apparatus 400 pre-allocates the metadata to the FAT region 520 and pre-allocate the plurality of clusters to the data region 530, the file recording apparatus 400 writes a file in the plurality of clusters allocated to the data region 530 (S820).

Upon the completion of the file write, if a size of the actually written file is different from the size of the allocated clusters, the file recording apparatus 400 updates the metadata (S830). At this time, the file recording apparatus 400 may not update access time information corresponding to the file.

Meanwhile, the file recording apparatus 400 may predict the size of the file before allocating the metadata to the non-volatile memory 420. The file recording apparatus 400 may allocate the metadata including the predicted file size to the FAT region 520.

Additionally, the file recording apparatus 400 may allocate the cluster chain contained in the metadata to the FAT region 520 in a page unit. That is, the file recording apparatus 400 may allocate the cluster chain in one or more pages included in the FAT region 520, and may allocate a cluster chain of another file in a page having an empty space (cluster) among the pages to which the cluster chain of the previous file is allocated.

In accordance with the file recording apparatus 400 and the file recording method of the example embodiments, the number of metadata updating per a file, which may be performed when recording the file in the non-volatile memory 420, can be reduced to several times to twice. Further, depend on the file recording apparatus 400 and the file recording method thereof, in consideration of the non-volatile memory 420, the number of updating upon a physical page in which the metadata is stored can be reduced to twice or less depending on the file involved. Therefore, the file recording apparatus 400 and the file recording method thereof can solve problems such as deterioration of a write performance and reduction in a lifetime which might easily occurs in an image file recording apparatus such as a black box.

The exemplary embodiments can be embodied in a storage medium including instruction codes executable by a computer or processor such as a program module executed by the computer or processor. A data structure in accordance with the exemplary embodiments can be stored in the storage medium executable by the computer or processor. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module or other data. The communication medium typically includes the computer-readable instruction code, the data structure, the program module, or other data of a modulated data signal such as a carrier wave, or other transmission mechanism, and includes information transmission mediums.

The system and method of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure.

Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A file recording apparatus, comprising:
a non-volatile memory having a boot region, a file allocation table (FAT) region and a data region;
and
a processor configured to:
predict a size of a first file to be stored in the non-volatile memory,
allocate metadata containing information of the predicted size of the first file to the FAT region,
allocate a plurality of clusters to the data region based on information of the predicted size of the first file included in the metadata,
write the first file in the plurality of clusters allocated to the data region, and
in response to a size of the written first file being different from a size of the plurality of allocated clusters, update the metadata based on the size of the written first file,
wherein the metadata includes information upon a first cluster chain of the plurality of clusters and the size of the first file.

2. The file recording apparatus of claim 1,
wherein the processor does not update access time information corresponding to the first file when updating the metadata.

3. The file recording apparatus of claim 1,
wherein the processor is further configured to allocate the first cluster chain included in the metadata to the FAT region in a page unit.

4. The file recording apparatus of claim 3,
wherein the processor is further configured to allocate the first cluster chain in one or more pages included in the FAT region, and allocate a second cluster chain of a second file in a page having an empty space among the one or more pages to which the first cluster chain of the first file is allocated.

5. The file recording apparatus of claim 1,
wherein the first file is an image file having a preset length.

6. The file recording apparatus of claim 1,
wherein the first file is an image recording file which is generated continually.

7. The file recording apparatus according to claim 1, further comprising:
a memory storing instructions, which when received by the processor, cause the processor to perform the instructions for managing a file recording.

8. The file recording apparatus according to claim 1, wherein the data region of the non-volatile memory comprises a directory entry.

9. A file recording method of a file recording apparatus, the method comprising:
predicting a size of a first file to be stored in a non-volatile memory, allocating metadata containing information of the predicted size of the first file to the FAT region, allocating metadata containing information of the predicted size of the first file to a file allocation table (FAT) region included in the non-volatile memory;

allocating a plurality of clusters to a data region included in the non-volatile memory based on information of the predicted size of the first file included in the metadata;

writing the first file in the plurality of clusters allocated to the data region after the allocating of the metadata and the allocating of the plurality clusters; and in response to a size of the written first file being different from a size of the plurality of allocated clusters, updating the predicted size of the first file included in the metadata based on the size of the written first file, wherein the non-volatile memory has the FAT region, the data region and a boot region, and wherein the metadata includes information upon a first cluster chain of the plurality of clusters and the size of the first file.

10. The file recording method of claim 9, wherein the allocating of the metadata comprises allocating the first cluster chain included in the metadata to the FAT region in a page unit.

11. The file recording method of claim 9, wherein the allocating of the metadata comprises:

allocating the first cluster chain to one or more pages included in the FAT region, and allocating a second cluster chain of a second file to a page having an empty space among the one or more pages to which the first cluster chain of the first file is allocated.

12. A non-transitory computer-readable recording medium having stored thereon computer-executable instructions that, in response to execution, cause the file recording method as claimed in claim 9 to be performed.

* * * * *